US010990124B2

(12) United States Patent
Murphy et al.

(10) Patent No.: US 10,990,124 B2
(45) Date of Patent: Apr. 27, 2021

(54) MOBILE COMPUTING DEVICE WITH CAMERA LENS IDENTIFIER

(71) Applicants: Madelyn Murphy, Syracuse, NY (US); Jenny A. Murphy, Syracuse, NY (US)

(72) Inventors: Madelyn Murphy, Syracuse, NY (US); Jenny A. Murphy, Syracuse, NY (US)

(*) Notice: Subject to any disclaimer, the term of this patent is extended or adjusted under 35 U.S.C. 154(b) by 0 days.

(21) Appl. No.: 16/259,708

(22) Filed: Jan. 28, 2019

(65) Prior Publication Data

US 2019/0235570 A1 Aug. 1, 2019

Related U.S. Application Data

(60) Provisional application No. 62/623,016, filed on Jan. 29, 2018.

(51) Int. Cl.
*G06F 1/16* (2006.01)
*H04M 1/18* (2006.01)
*H04M 1/02* (2006.01)

(52) U.S. Cl.
CPC .......... *G06F 1/1609* (2013.01); *G06F 1/1626* (2013.01); *H04M 1/185* (2013.01); *G06F 2200/1634* (2013.01); *H04M 1/0264* (2013.01)

(58) Field of Classification Search
CPC ..... G06F 1/1609; G06F 1/1626; H04M 1/185
See application file for complete search history.

(56) References Cited

U.S. PATENT DOCUMENTS 7,964,259 B2 * 6/2011 Koshu .................. G09F 3/0292
428/195.1
2005/0116334 A1 * 6/2005 Buehler ................ H04B 1/3888
257/704
2010/0097327 A1 * 4/2010 Wadsworth ......... G06F 3/04886
345/173
2010/0183290 A1 * 7/2010 Yang ...................... G03B 17/00
396/448
2011/0058255 A1 * 3/2011 Weiss .................. H04M 1/0264
359/511
2011/0272088 A1 * 11/2011 Cincotti ................... F41H 3/02
156/247
2012/0301132 A1 * 11/2012 Mitskog .................... B32B 7/12
396/448

(Continued)

FOREIGN PATENT DOCUMENTS

JP 2005275074 A * 10/2005

*Primary Examiner* — Anthony Q Edwards
(74) *Attorney, Agent, or Firm* — Bond, Schoeneck & King, PLLC; Frederick J. M. Price (57) ABSTRACT

A camera lens identifying system. The system includes a smartphone having a front side with a forward facing camera and an indicator on the smartphone surrounding the forward facing camera. The indicator identifying the forward facing camera lens may be a sticker, other attachment, downloadable application, or physical property of the phone. The system may include a cover, such as a screen protector. The cover has a top portion with a slot sized to fit around the forward facing camera. The indicator is on the cover surrounding the slot or the opening for the forward facing camera. When users are able to quickly locate a camera lens on a mobile phone or smartphone prior to snapping the photo, their eyes are looking in the right place, resulting in a better image and better eye contact. The camera lens identifying system permits users to quickly locate the camera lens.

10 Claims, 9 Drawing Sheets

(56) References Cited

U.S. PATENT DOCUMENTS

| | | | |
|---|---|---|---|
| 2013/0329173 A1* | 12/2013 | Jung | H05K 9/0054 349/122 |
| 2014/0192467 A1* | 7/2014 | Kwong | H01J 37/3171 361/679.3 |
| 2014/0198439 A1* | 7/2014 | De Pietro | G06F 1/1686 361/679.02 |
| 2015/0059251 A1* | 3/2015 | Rinner | H04B 1/3888 49/465 |
| 2015/0163382 A1* | 6/2015 | Kwong | H04N 5/2254 348/375 |
| 2016/0044148 A1* | 2/2016 | Pizzo | H04M 1/026 455/575.8 |
| 2016/0049979 A1* | 2/2016 | Grouwstra | H04B 1/3888 455/575.8 |
| 2016/0131592 A1* | 5/2016 | Cooper | G01N 21/78 356/402 |
| 2016/0225294 A1* | 8/2016 | Hodgson | G09F 3/10 |
| 2017/0013097 A1* | 1/2017 | Edmonds | G02B 27/025 |
| 2017/0115702 A1* | 4/2017 | Stoller | G06F 3/041 |
| 2017/0253014 A1* | 9/2017 | Kleeman | B32B 37/003 |
| 2018/0307269 A1* | 10/2018 | Pantel | G06F 1/1637 |
| 2018/0359376 A1* | 12/2018 | Krause | H04N 5/2256 |
| 2019/0176190 A1* | 6/2019 | Kim | B05D 5/065 |
| 2019/0274208 A1* | 9/2019 | Zeira | H05B 47/19 |
| 2020/0089082 A1* | 3/2020 | Sondrup-Ottsen | G03B 11/04 |

\* cited by examiner

MOBILE COMPUTING DEVICE WITH CAMERA LENS IDENTIFIER

CROSS-REFERENCE TO RELATED APPLICATIONS

This application claims priority to U.S. Provisional Patent Application Ser. No. 62/623,016, filed on Jan. 29, 2018 and entitled "Mobile Computing Device Screen Protector with Camera Lens Identifier."

BACKGROUND OF THE INVENTION

1. Field of the Invention

The present invention relates to mobile computing device screen protectors and stickers, and, more specifically, to a mobile computing device including a camera lens identifier.

2. Description of Related Art

Current mobile computing devices with built in camera and video technology, such as smart phones and tablets, are ubiquitous. When a user takes a picture of herself alone or with others ("selfie"), it is often difficult for the user and others to locate the camera lens on the face of the mobile computing device (due to its size and lack of any highly distinguishable features). The camera lens on the face of phones blends in and is not easy to see. Users often look at their own face when taking selfies. As a result, photos have poor eye contact and the subjects appear to be looking sideways. In other words, "selfie" pictures that are taken often show the subjects of the picture not looking directly at the camera.

Current mobile computing devices often require screen protection in the form of protective plastic film or glass overlays, for example, to protect the screens of the mobile computing devices from scratches and cracks. Conventional screen protectors are clear, blend into the face of the mobile computing device, and exist solely to protect certain components of the mobile computing device without obstructing any part of the user interface.

Therefore, there is a need for an indicator on a screen protector or sticker for identifying the camera lens on a smartphone.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

Embodiments of the present invention recognize that there are potential problems and/or disadvantages with current smartphones. For example, users do not know where to focus their eyes when using the forward facing camera. Therefore, a need exists for an identifying system for signaling the location of the forward facing camera. Various embodiments of the present invention may be advantageous in that they may solve or reduce one or more of the potential problems and/or disadvantages discussed herein.

The present disclosure is directed to an inventive configuration, structure, and resulting function of a camera lens identifying system. According to one aspect, the camera lens identifying system includes a smartphone having a front side with a forward facing camera and an indicator on the smartphone surrounding the forward facing camera. According to another aspect, the camera lens identifying system includes a smartphone having a front side with forward facing camera, a cover having a top portion with a slot or an opening sized to fit around the forward facing camera, and an indicator on the cover surrounding the slot or the opening.

According to another aspect, the present invention is a method for using a camera lens indicator. The method includes the steps of: (i) providing a camera lens indicator having an adhesive surface; (ii) aligning the camera lens indicator over a forward facing camera of a smartphone; and (iii) attaching the camera lens indicator, via the adhesive surface, to a front side of the smartphone such that the camera lens indicator surrounds the forward facing camera.

Embodiments of the present invention are not limited to smart phones. For example, any personal computing devices such as personal computers, desktops, laptops, tablets, as well as any other fixed or mobile computerized device including a camera, camera lens and related processor (as should be understood by a person of ordinary skill in the art in conjunction with a review of this disclosure) are appropriate and can be used and/or form part of the invention.

These and other aspects of the invention will be apparent from the embodiments described below.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
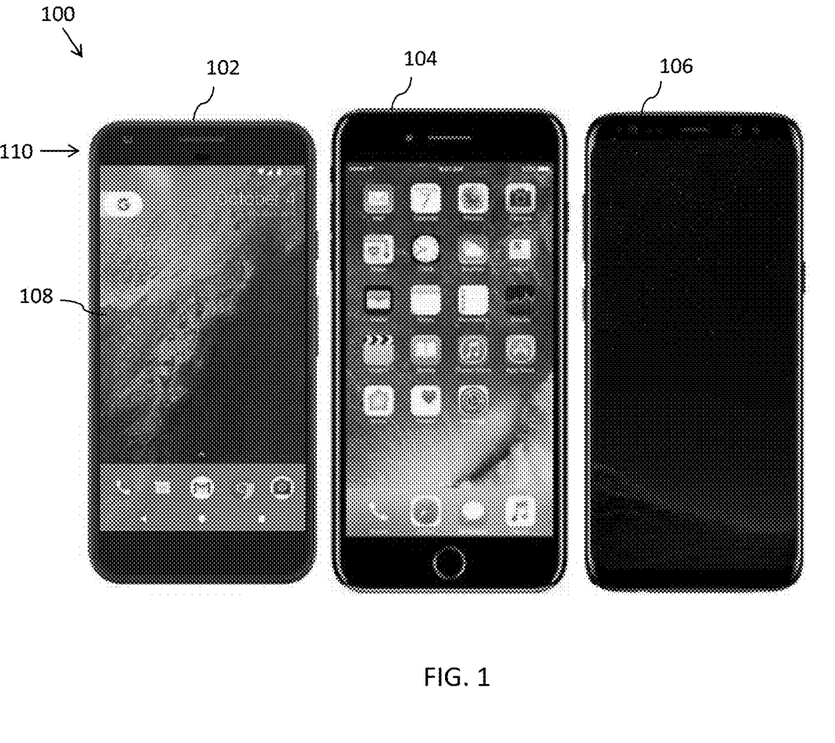
FIG. 1 is a front view schematic representation of exemplary smartphones.

Referring now to the figures, wherein like reference numerals refer to like parts throughout, FIG. 1 shows a front view schematic representation of exemplary smartphones 100. The smartphones 100 can be any cellular or mobile device with a forward facing camera 106. The forward facing camera 106 in on a first side 108 of the smartphones 100. In the depicted embodiment, the exemplary smartphones 100 include a Google Pixel 102, Apple iPhone 104, and Samsung Galaxy 106. Each of the smartphones 100 is rectangular with the forward facing camera 106 at a top portion 110 on the first side 108.

Figure 2:
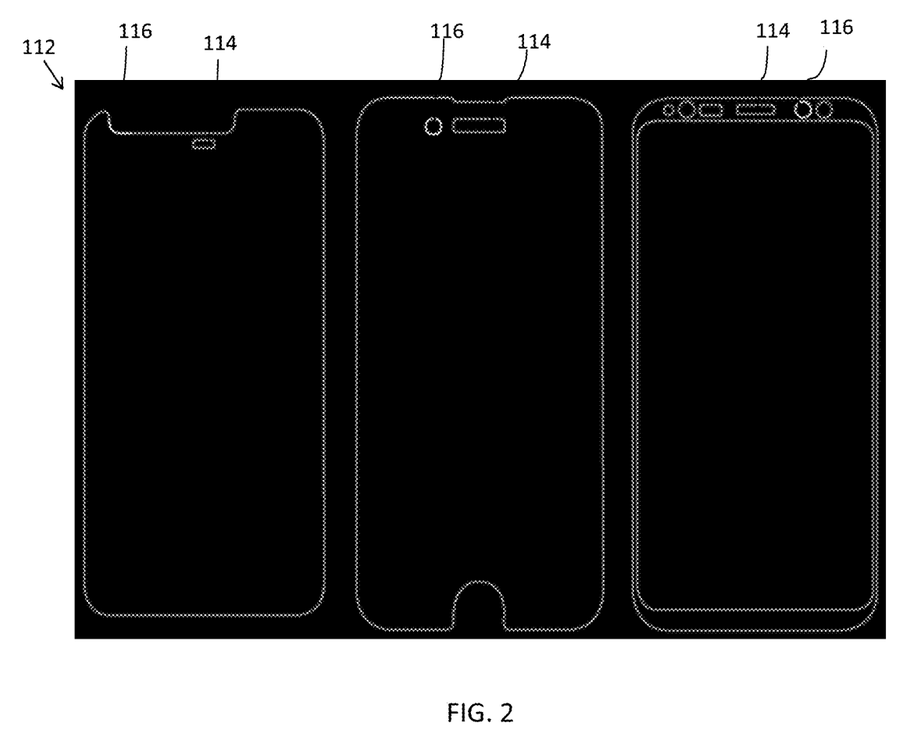
FIG. 2 is a front view schematic representation of a cover for each of the exemplary smartphones of FIG. 1.
Figure 3:
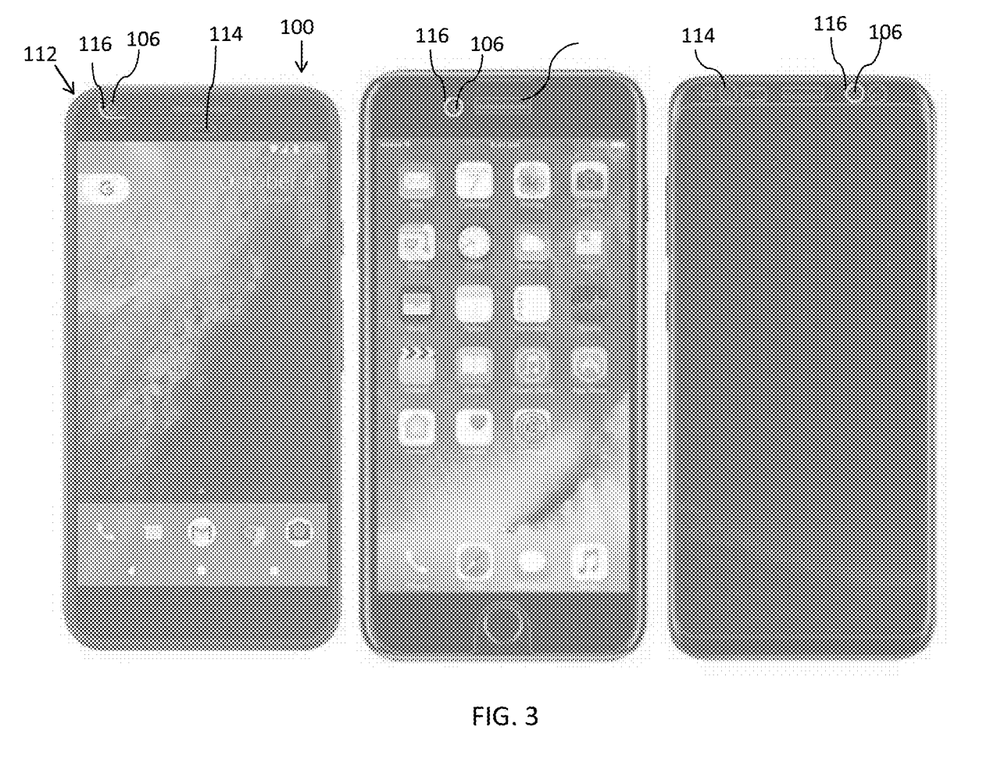
FIG. 3 is a front view schematic representation of the covers of FIG. 2 on the front side of the exemplary smartphones of FIG. 1.

Turning now to FIG. 2, there is shown a front view schematic representation of a cover 112 for each of the exemplary smartphones 100 of FIG. 1. The cover 112 is composed of material, such as tempered glass (e.g., aluminosilicate) or plastic such as polyethylene terephthalate (PET) or thermoplastic polyurethane (TPU), or tempered glass or Gorilla® Glass. The cover 112 has a variety of slots and openings 114 for the features of the smartphone 100. For example, the cover 112 has an opening 116 for the forward facing camera 106. The cover 112 is configured for attachment to the smartphone 100, as shown in FIG. 3. In the depicted embodiment, the cover 112 is attached to the front side 108 of the smartphone 100. In FIG. 3, each smartphone 100 has a cover 112 attached and the cover 112 has an opening 116 (or slot) around the forward facing camera 106.

Figure 4:
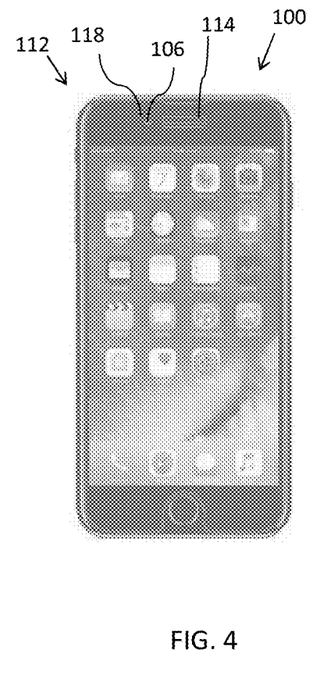
FIG. 4 is a front view schematic representation of a cover, having an indicator, attached to the front side of exemplary smartphone.
Figure 5:
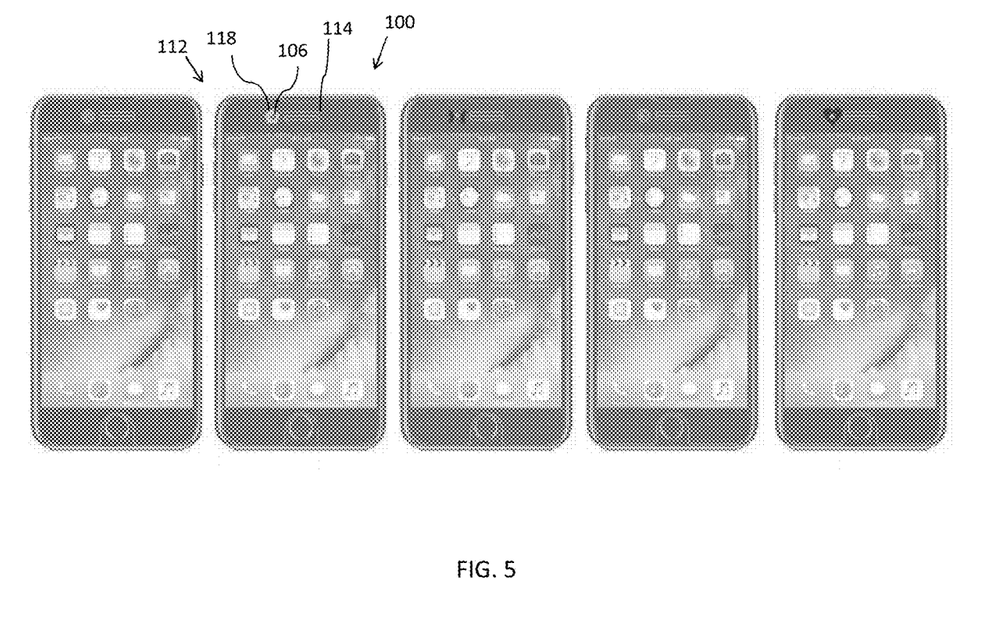
FIG. 5 is a front view schematic representation of covers having indicators of different shapes.
Figure 6:
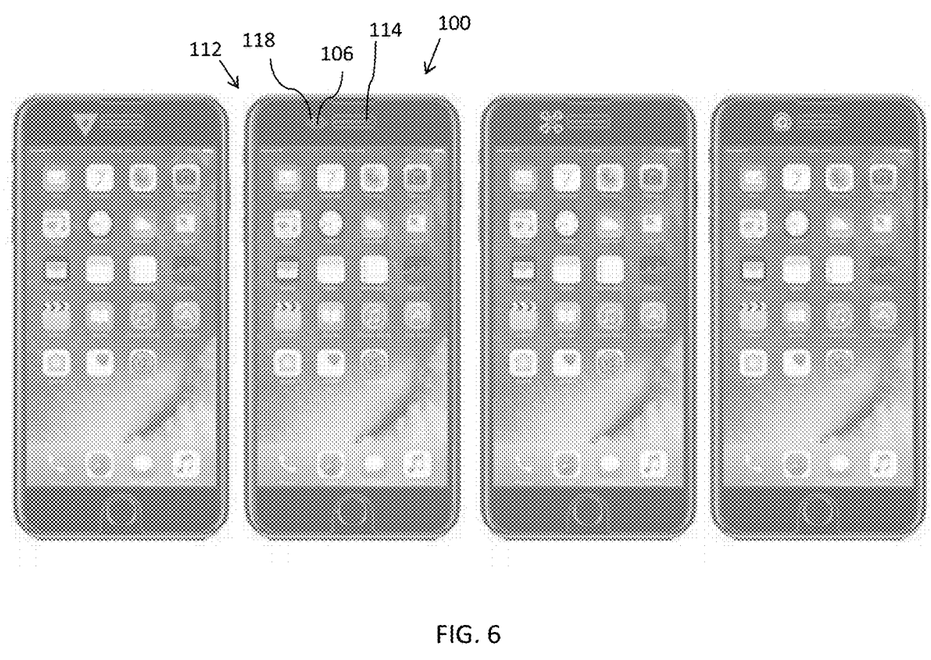
FIG. 6 is another is a front view schematic representation of covers having indicators of different shapes.

Referring now to FIG. 4, there is shown a front view schematic representation of a cover 112, having a camera lens indicator 118. In the depicted embodiment, the cover 112 comprises an indicator 118 encircling or otherwise placed around the opening 116 for the forward facing camera 106. The indicator 118 may be printed on the cover 112 or formed within the cover 112. The indicator 118 can be a 2D indicator or a 3D indicator. The indicator 118 in FIG. 4, is circular and is a color contrasting the color of the smartphone 100 (although, any color can be used). FIGS. 5-6 show exemplary alternative embodiments of indicators 118 on covers 112. The indicators 118 in FIGS. 5-6 include geometric shapes and other shapes, such as a sun, flower, butterfly, basketball, heart, triangle, eye, cross bones, and baseball. Any other conceivable shapes, patterns, markings and/or designs can be used for the indicator 118.

The indicator 118 makes it quickly obvious to the user and other photograph/video subjects where the forward facing camera 106 is located. This results in stronger, higher quality images. The indicator 118 allows the photograph/video subjects to know the location of the forward facing camera 106 on the smartphone 100, and eye contact between the person being photographed and the person viewing the photo can be made, resulting in stronger images/connection between viewer and subject.

Figure 7:
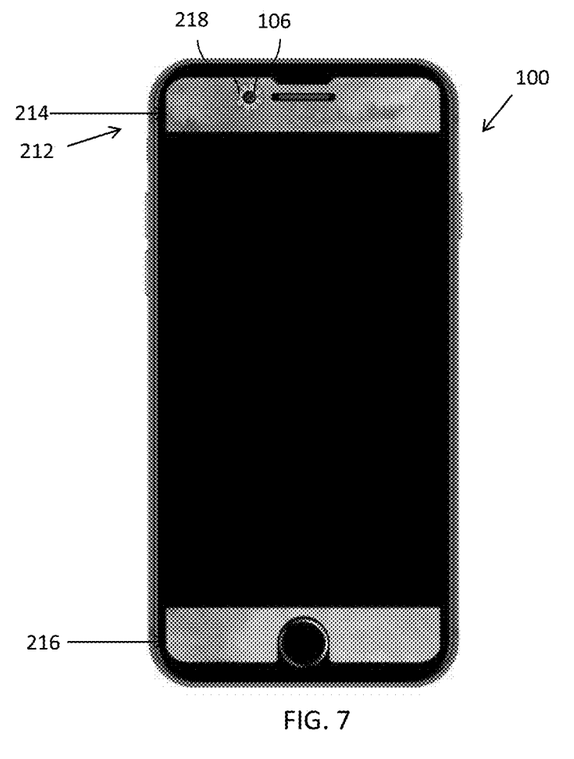
FIG. 7 is a front view schematic representation of a cover with an indicator, according to an alternative embodiment.

Turning now to FIG. 7, there is shown a front view schematic representation of a cover 212 with an indicator 218, according to an alternative embodiment. In the depicted embodiment, the cover 212 is a two-piece cover, including a top portion 214 and a bottom portion 216. The top portion 214 and the bottom portion 216 are stickers or other adhesive materials. The top and bottom portions 214, 216 are preferably composed of vinyl (on a first side 220 with an adhesive on a second side (not shown). The top portion 214 of the cover 212 includes the indicator 218 for placement around a forward facing camera 106. The indicator 218 can be any color, shape, or design, such as those shown in FIGS. 5-6.

Figure 8:
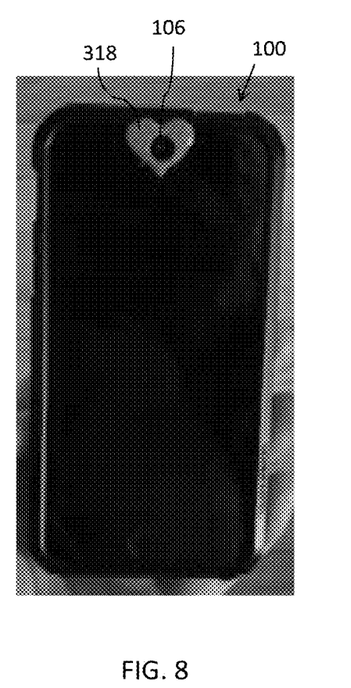
FIG. 8 is a front view schematic representation of an indicator, according to an alternative embodiment.
Figure 9:
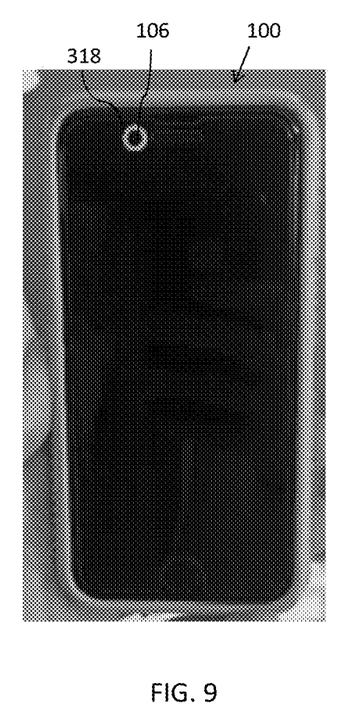
FIG. 9 is another front view schematic representation of an indicator, according to an alternative embodiment.

Referring now to FIGS. 8-9, there are shown front view schematic representations of the indicator 318, according to an alternative embodiment. In the depicted embodiment, the indicator 318 is separate from the cover 112 (FIG. 2). The indicator 318 shown in FIGS. 8 and 9 is a sticker or other similar adhesive material. The indicator 318 is placed around the forward facing camera 106. Thus, the indicator 318 can be used with any smartphone 300 (with or without the cover 112 (FIG. 2)). Further, the indicator 318 in FIGS. 8 and 9 can be placed on the smartphone 100 around the forward facing camera 106 and removed for use on another smartphone 100 or when the user no longer desires to use the indicator 318.

In other alternative embodiments, the indicator is placed on or around the smartphone. The indicator may be an elastic band material with a ring or other shape attached. The elastic can be wrapped around the smartphone such that the ring or other shape is around the forward facing camera. The indicator may also be an object which clips on or otherwise attaches to the top portion of the smartphone to surround or point toward the forward facing camera.

In another embodiment, the camera lens identifying system comprises a downloadable smartphone (or other mobile device) application that identifies the forward facing camera. When a user opens or otherwise launches the application, the forward facing camera of the smartphone is activated. As the forward facing camera is activated, arrows, circles, or other eye-catching indicators (shapes, designs, words, etc.) point toward, encircle, or otherwise highlight the forward facing camera. In yet another embodiment, the camera lens identifying system comprises structural features built into the smartphone. For example, the smartphone may comprise a light source, such as a LED encircling the forward facing camera. When a user activates the forward facing camera of the smartphone, the light source is activated, illuminating a circle surrounding the forward facing camera. Similarly, arrows or other eye-catching indicators can be implemented as structural features of the smartphone to highlight the forward facing camera.

All definitions, as defined and used herein, should be understood to control over dictionary definitions, definitions in documents incorporated by reference, and/or ordinary meanings of the defined terms.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A camera lens identifying system, comprising:
    a personal computing device having a front side with forward facing camera lens;
    a cover sized to fit over the front side of the personal computing device and having a top portion with a slot or an opening sized to fit around the forward facing camera lens, wherein the cover has an adhesive surface configured to adhere to the front side of the personal computing device and wherein the cover is a screen protector composed of tempered glass; and
    an indicator on the cover fully surrounding the slot or the opening.

2. The system of claim 1, wherein the cover is sized and configured to fit a screen of the personal computing device.

3. The system of claim 1, wherein the cover comprises two pieces, the top portion and a bottom portion.

4. The system of claim 1, wherein the personal computing device is selected from the group consisting of a desktop, a laptops, a tablets and a smart phone.

5. A method for using a camera lens indicator, comprising the steps of:
    providing a camera lens indicator having an adhesive surface and an opposite surface composed of vinyl, wherein the camera lens indicator is on a cover sized to fit a screen of the personal computing device and wherein the cover is a screen protector composed of tempered glass;
    aligning the camera lens indicator over a forward facing camera lens of a personal computing device; and
    attaching the camera lens indicator, via the adhesive surface, to a front side of the personal computing device such that the camera lens indicator fully surrounds the forward facing camera lens.

6. The method of claim 5, wherein the camera lens indicator is a geometric shape.

7. The method of claim 5, wherein the cover comprises two separate pieces, a top portion and a bottom portion, and wherein the top portion having the camera lens indicator.

8. The method of claim 5, wherein the personal computing device is selected from the group consisting of a desktop, a laptops, a tablets and a smart phone.

9. The system of claim 5, wherein the indicator comprises a color different from a color of the personal computing device.

10. The system of claim 5, wherein the indicator comprises a design feature different from a design feature of the front side of the personal computing device.

* * * * *